US012624196B2

(12) United States Patent
Kondo

(10) Patent No.: US 12,624,196 B2
(45) Date of Patent: May 12, 2026

(54) RUBBER COMPOSITION, VULCANIZED OBJECT OBTAINED FROM SAID RUBBER COMPOSITION, AND VULCANIZED MOLDED OBJECT OBTAINED FROM SAID RUBBER COMPOSITION

(71) Applicant: DENKA COMPANY LIMITED, Tokyo (JP)

(72) Inventor: Atsunori Kondo, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 463 days.

(21) Appl. No.: 18/033,612

(22) PCT Filed: Nov. 19, 2021

(86) PCT No.: PCT/JP2021/042561

§ 371 (c)(1),
(2) Date: Apr. 25, 2023

(87) PCT Pub. No.: WO2022/113896

PCT Pub. Date: Jun. 2, 2022

(65) Prior Publication Data

US 2023/0365791 A1 Nov. 16, 2023

(30) Foreign Application Priority Data

Nov. 26, 2020 (JP) ................................ 2020-196250

(51) Int. Cl.

| | |
|---|---|
| ***C08L 11/00*** | (2006.01) |
| ***C08K 3/22*** | (2006.01) |
| ***C08K 3/26*** | (2006.01) |
| ***C08K 3/36*** | (2006.01) |
| ***C08K 5/14*** | (2006.01) |
| ***C08K 5/541*** | (2006.01) |
| ***C08K 5/5425*** | (2006.01) |

(52) U.S. Cl.

CPC ................ *C08L 11/00* (2013.01); *C08K 3/36* (2013.01); *C08K 5/14* (2013.01); *C08K 5/541* (2013.01); *C08K 2003/2224* (2013.01); *C08K 2003/267* (2013.01); *C08K 5/5425* (2013.01); *C08K 2201/006* (2013.01); *C08K 2201/014* (2013.01)

(58) Field of Classification Search

CPC ..... C08L 11/00; C08K 3/36; C08K 2201/014; C08K 2003/2224; C08K 2003/267; C08K 5/5425

See application file for complete search history.

(56) References Cited

U.S. PATENT DOCUMENTS

| | | | |
|---|---|---|---|
| 2015/0073086 | A1 | 3/2015 | Isono et al. |
| 2018/0346700 | A1 | 12/2018 | Nishiguchi et al. |
| 2018/0346702 | A1 | 12/2018 | Nishiguchi et al. |

FOREIGN PATENT DOCUMENTS

| | | | | |
|---|---|---|---|---|
| JP | 2002-155168 | A | | 5/2002 |
| JP | 2004-210993 | A | | 7/2004 |
| JP | 2006321958 | A | * | 11/2006 |
| JP | 2008-231248 | A | | 10/2008 |
| JP | 2009-024037 | A | | 2/2009 |
| JP | 2012-211345 | A | | 11/2012 |
| JP | 2014-196407 | A | | 10/2014 |
| JP | 2016-113500 | A | | 6/2016 |
| JP | 2017-141384 | A | | 8/2017 |
| WO | 2017/138640 | A1 | | 8/2017 |

OTHER PUBLICATIONS

Machine translation of JP-2006321958-A obtained from espacenet (Year: 2006).*

Feb. 1, 2022 International Search Report issued in International Patent Application No. PCT/JP2021/042561.

* cited by examiner

*Primary Examiner* — Kregg T Brooks
*Assistant Examiner* — David R. Foss
(74) *Attorney, Agent, or Firm* — Oliff PLC

(57) ABSTRACT

A rubber composition, by which a vulcanizate having excellent vulcanization speed, abrasion resistance and low temperature rise can be obtained, is provided. A rubber composition including 100 parts by mass of a chloroprene-based rubber, 20 to 80 parts by mass of silica, 1 part by mass or more and less than 20 parts by mass of a hydrate, and 0.3 to 1.4 parts by mass of an organic peroxide, wherein the rubber composition includes 0.5 to 15 parts by mass of a silane coupling agent having a double bond in a structure of the silane coupling agent with respect to 100 parts by mass of the silica.

11 Claims, No Drawings

RUBBER COMPOSITION, VULCANIZED OBJECT OBTAINED FROM SAID RUBBER COMPOSITION, AND VULCANIZED MOLDED OBJECT OBTAINED FROM SAID RUBBER COMPOSITION

TECHNICAL FIELD

A chloroprene-based rubbers is excellent in mechanical properties, ozone resistance, and chemical resistance, and are used in a wide range of fields such as automobile parts, adhesives, and various industrial rubber parts, taking advantage of these properties. In recent years, the performance required for rubber parts has increased significantly, and in addition to mechanical properties such as abrasion resistance and low temperature rise in dynamic environments, improving the vulcanization speed is required to improve productivity.

BACKGROUND ART

As a technology for improving the vulcanization speed of rubber, as described in Patent Literature 1, it is known that a rubber composition characterized by blending 5 to 200 parts by mass of silica and 0.1 to 10 parts by mass of a cyclic polysulfide represented by formula (1) with respect to 100 parts by mass of diene rubber, and 1 to 20% by mass of silane coupling agent with respect to the mass of the silica, 1 to 20% by mass of a glycerin mono fatty acid ester derived from a fatty acid having a carbon number of 8 to 24 with respect to the mass of the silica.

In addition, as a technique for improving the abrasion resistance of a rubber, as described in Patent Literature 2, a composition for chloroprene vulcanized rubber is known. The composition for chloroprene vulcanized rubber comprises 100 parts by mass of a polymer for chloroprene vulcanized rubber, 0.5 to 6 parts by mass of an acid acceptor, 0.2 to 3 parts by mass of a lubricant, 1 to 5 parts by mass of an antioxidant, 10 to 120 parts by mass of carbon black, 0.1 to 20 parts by mass of a filler other than carbon black, 2 to 40 parts by mass of a softening agent, 0.2 to 5 parts by mass of a processing aid, 0.5 to 10 parts by mass of a metal oxide, 0.5 to 5 parts by mass of a vulcanization accelerator, wherein the polymer is a copolymer comprising 80 to 97% by mass of 2-chloro-1,3-butadiene (chloroprene) (C-1) and 20 to 3% by mass of 2,3-dichloro-1,3-butadiene (C-2); or 79.8 to 96.8% by mass of 2-chloro-1,3-butadiene (chloroprene) (C-1), 20 to 3% by mass of 2,3-dichloro-1,3-butadiene (C-2) and 0.2 to 17% by mass of a monomer copolymerizable with these (C-3), as a fraction of each monomer constituting the polymer with respect to 100% by mass of the total amount of all monomers, and the Mooney viscosity (ML1+4 (100° C.)) of the polymer is in the range of 100 to 135.

As a technique for reducing the temperature rise of rubber, as described in Patent Literature 3, a rubber composition is known. The rubber composition comprises more than 0 to 100 parts by mass of silica with respect to 100 parts by mass of total rubber components including two or more kinds of diene rubber, wherein the diene rubber is divided into two or more phases each having a different glass transition temperature, at least one phase of which has a continuous structure, and at least one phase of which has a glass transition temperature of −50° C. or higher, and 80% or more by mass of the amount of silica per unit volume of the blended rubber is contained in the at least one phase having a glass transition temperature of −50° C. or higher, and the average aggregate area of the silica contained in the phase is less than 2000 $nm^2$.

CITATION LIST

Patent Literature

Patent Literature 1 JP-A-2016-113500
Patent Literature 2 JP-A-2012-211345
Patent Literature 3 JP-A-2014-196407

SUMMARY OF INVENTION

Technical Problem

For rubber compositions containing a chloroprene polymer, it is required to achieve a high degree of compatibility of various properties in a vulcanizate of the rubber composition, and it may be required to provide the vulcanizate having excellent abrasion resistance, low temperature rise in a dynamic environment, excellent vulcanization speed and high productivity.

An object of one aspect of the present invention is to provide a rubber composition having excellent abrasion resistance, low temperature rise in a dynamic environment, excellent vulcanization speed and high productivity. Another object of the present invention is to provide a vulcanizate of the rubber composition. A main object of another aspect of the present invention is to provide a vulcanized molded body of the rubber composition.

Solution To Problem

One aspect of the present invention relates to a rubber composition comprising 100 parts by mass of a chloroprene-based rubber, 20 to 80 parts by mass of silica, 1 part by mass or more and less than 20 parts by mass of a hydrate, and 0.3 to 1.4 parts by mass of an organic peroxide, wherein the rubber composition includes 0.5 to 15 parts by mass of a silane coupling agent having a double bond in a structure of the silane coupling agent with respect to 100 parts by mass of the silica.

Preferably, the chloroprene-based rubber contains a homopolymer of 2-chloro-1,3-butadiene or a copolymer of 2-chloro-1,3-butadiene and at least one monomer selected from 2,3-dichloro-1,3-butadiene and acrylonitrile.

Preferably, the silane coupling agent having a double bond in the structure of the silane coupling agent is at least one silane coupling agent selected from vinyltrimethoxysilane, vinyltriethoxysilane, 3-(meth)acryloxypropyl methyl dimethoxysilane, 3-(meth)acryloxypropyl methyl trimethoxysilane, 3-(meth)acryloxypropylmethyldiethoxysilane and 3-(meth)acryloxypropylmethyltriethoxysilane.

Preferably, wherein the hydrate is a hydrate releasing $H_2O$ in a temperature range of 100° C. to 250° C.

Preferably, the hydrate is at least one hydrate selected from a hydrotalcite compound represented by formula (1), a hydrate, and a metal hydroxide, $$[M^{2+}_{1-x}M^{3+}_{x}(OH)_2]^{x+}[A^{n-}_{x/n}\cdot mH_2O]^{x-} \quad (1)$$

in the formula (1), $M^{2+}$ is at least one divalent metal ion selected from $Mg^{2+}$, $Mn^{2+}$, $Fe^{2+}$, $Co^{2+}$, $Ni^{2}{}_{+}$, $Cu^{2+}$, and $Zn^{2+}$, $M^{3+}$ is at least one trivalent metal ion selected from $Al^{3+}$, $Fe^{3+}$, $Cr^{3+}$, $Co^{3+}$, and $In^{3+}$, and $A^{n-}$ is at least one anion selected from $OH^-$, $F^-$, $Cl^-$, $Br^-$, $NO_3^-$, $CO_3^{2-}$, $SO_4^{2-}$, $Fe(CN)_6^{3-}$, and $CH_3COO^-$, and X satisfies $0<X\leq 0.33$.

Preferably, the hydrate is at least one hydrate selected from hydrotalcite compounds represented by $Mg_{4.3}Al_2(OH)_{12.6}CO_3 \cdot 3.5H_2O$, $Mg_3ZnAl_2(OH)_{12}CO_3 \cdot 3H_2O$, $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, and $Mg_3Al_2(OH)_{10}CO_3 \cdot 1.7H_2O$.

Preferably, the organic peroxide is at least one organic peroxide selected from dicumyl peroxide, 1,4-bis[(t-butylperoxy)isopropyl]benzene, t-butyl α-cumyl peroxide, 2,5-dimethyl-2,5-bis(t-butylperoxy)hexane, 2,5-dimethyl-2,5-bis(t-butylperoxy)hexyne-3.

Preferably, the silica has a cetyltrimethylammonium bromide (CTAB) adsorption specific surface area of 50 to 300 $m^2/g$.

Another aspect of the present invention relates to a vulcanizate of the rubber composition described above. Another aspect of the present invention relates to a vulcanized molded body of the rubber composition described above.

DESCRIPTION OF EMBODIMENTS

Preferred embodiments for carrying out the present invention will be described below. It should be noted that the embodiments described below are examples of representative embodiments of the present invention, and the scope of the present invention should not be construed narrowly.

Rubber Composition

The rubber composition according to the present embodiment comprises (1) 100 parts by mass of a chloroprene-based rubber, (2) 20 to 80 parts by mass of silica, (3) 1 part by mass or more and less than 20 parts by mass of a hydrate, and (4) 0.3 to 1.4 parts by mass of an organic peroxide, (5) wherein the rubber composition includes 0.5 to 15 parts by mass of a silane coupling agent having a double bond in a structure of the silane coupling agent with respect to 100 parts by mass of the silica.

According to the rubber composition according to the present embodiment, a vulcanizate obtained by vulcanizing the rubber composition can has excellent abrasion resistance and low temperature rise in a dynamic environment.

In recent years, in addition to physical properties such as abrasion resistance and low temperature rise required for rubber parts, improvement in vulcanization speed has been demanded from the viewpoint of productivity. As a result of intensive study in order to meet such requirements, the present inventors have found that vulcanization speed can be improved simultaneously with physical properties such as abrasion resistance and low temperature rise by using a specific amount of silica as a filler, a specific amount of a silane coupling agent having a double bond in a structure of the silane coupling agent with respect to the silica, an organic peroxide as a sulfur agent, and a hydrate instead of magnesium oxide or the like.

A mechanism, which improves vulcanization speed simultaneously with physical properties such as abrasion resistance and low temperature rise by using a specific amount of silica as a filler, a specific amount of a silane coupling agent having a double bond in a structure of the silane coupling agent with respect to the silica, an organic peroxide as a sulfur agent, and a hydrate instead of magnesium oxide or the like, is considered as follows. However, it does not limit the present invention.

First, by protecting the surface of silica added as a filler with a silane coupling agent having a double bond, the dispersibility of the silica is improved. In addition, by using an organic peroxide as a vulcanizing agent, the double bond portion of the silane coupling agent reacts with the rubber portion, and the abrasion resistance, low temperature rise, and reinforcing properties in the resulting vulcanizate are improved. The protection of the silica by the silane coupling agent is achieved by hydrolysis of itself and condensation reaction of the hydrolyzate and the silica. Therefore, by adding the hydrate as well as the silane coupling agent during processing, the heat generated during kneading releases hydrated water ($H_2O$) from the hydrate, and this released water promotes hydrolysis of the silane coupling agent, which may strengthen the protection of silica and contribute to improved reinforcement properties.

It is also presumed that the decomposition of organic peroxides is accelerated during vulcanization by the desorption of hydration water from the hydrates and the $H_2O$ produced by the chlorine capture reaction of the hydrochloric acid generated from chloroprene-based rubber, thereby increasing the rate of vulcanization.

(1) Chloroprene-Based Rubber

A chloroprene-based rubber is mainly composed of a chloroprene polymer. The chloroprene polymer is a homopolymer of 2-chloro-1,3-butadiene (hereinafter referred to as chloroprene), or a copolymer of chloroprene and other monomers that can be copolymerized with chloroprene, or a mixture of these polymers. Other monomers copolymerizable with chloroprene preferably include for example:

- esters of acrylic acid such as methyl acrylate, butyl acrylate, 2-ethylhexyl acrylate, and the like;
- esters of methacrylic acid such as methyl methacrylate, butyl methacrylate, 2-ethyl hexyl methacrylate, and the like;
- hydroxy(meth)acrylates such as 2-hydroxyethyl(meth) acrylate, 2-hydroxymethyl(meth)acrylate, 2-hydroxypropyl(meth)acrylate, and the like; and 2,3-di chloro-1,3-butadiene, 1-chloro-1,3-butadiene, butadiene, isoprene, ethylene, styrene, acrylonitrile, and the like. Other monomers copolymerizable with chloroprene preferably include at least one monomer selected from 2,3-dichloro-1,3-butadiene and acrylonitrile.

When a copolymer of chloroprene and other monomers copolymerizable with chloroprene is used as the chloroprene-based rubber, the copolymerization amount of the other monomers is preferably 50 parts by mass or less and more preferably 30 parts by mass or less, with respect to 100 parts by mass of chloroprene. By adjusting the amount of the other monomers to be copolymerized within this range, the effect of copolymerizing these monomers can be exhibited without impairing the properties of the resulting rubber composition.

A chloroprene-based rubber according to one embodiment of the present invention preferably contains a homopolymer of 2-chloro-1,3-butadiene or a copolymer of 2-chloro-1,3-butadiene and at least one monomer selected from 2,3-dichloro-1,3-butadiene and acrylonitrile. A chloroprene-based rubber according to one embodiment of the present invention may composed of a homopolymer of 2-chloro-1,3-butadiene and/or a copolymer of 2-chloro-1,3-butadiene and at least one monomer selected from 2,3-dichloro-1,3- butadiene and acrylonitrile. The chloroprene-based rubber of one embodiment of the invention can also be composed of a homopolymer of 2-chloro-1,3-butadiene.

Other monomers to be copolymerized with chloroprene are not limited to one type, and the polymer may be a polymer, for example, obtained by copolymerizing three or more types of monomers including chloroprene. Also, the polymer structure of the polymer is not particularly limited.

Method of Manufacturing Chloroprene-Based Rubber

The chloroprene-based rubber is obtained by emulsion polymerization of raw material monomers including chloroprene as a main component in the presence of a polymerization reaction catalyst, a polymerization initiator, a chain transfer agent, or the like, using rosin or the like as an emulsifying dispersant.

Examples of the catalysts for the polymerization reaction include inorganic peroxides such as potassium sulfate, and organic peroxides such as ketone peroxides, peroxyketals, hydroperoxides, dialkyl peroxides, and diacyl peroxides. Examples of a catalyst activator include sodium sulfite, potassium sulfite, iron(II) oxide, anthraquinone, β-sodium sulfonate, formamidinesulfonic acid, L-ascorbic acid and the like.

The polymerization initiator is not particularly limited and known polymerization initiators generally used for emulsion polymerization of chloroprene monomer, such as potassium persulfate, ammonium persulfate, sodium persulfate, hydrogen peroxide, t-butyl hydroperoxide, and the like, is used.

The chain transfer agent is also not particularly limited, and those commonly used for emulsion polymerization of chloroprene can be used.

Specifically, example of the chain transfer agent preferably used include:

long-chain alkylmercaptans such as n-dodecylmercaptan, t-dodecylmercaptan, n-octylmercaptan;

xanthogen compounds such as diisopropyl xanthogen disulfide and diethyl xanthogen disulfide;

iodoform, thiocarbonyl compound such as benzyl 1-pyrrole dithiocarbamate (also known as benzyl 1-pyrrole carbodithioate), benzyl phenyl carbodithioate, 1-benzyl-N,N dimethyl-4-aminodithiobenzoate, 1-benzyl-4-methoxydithiobenzoate, 1-phenylethylimidazole dithiocarbamate (also known as 1-phenylethylimidazole carbodithioate), benzyl-1-(2-pyrrolidinone)dithiocarbamate (also known as benzyl-1-(2-pyrrolidinone)carbodithioate), benzyl phthalimidyl dithiocarbamate (also known as benzyl phthalimidyl carbodithioate), 2-cyanoprop-2-yl-1-pyrroledithiocarbamate (also known as 2-cyanoprop-2-yl-1-pyrrolecarbodithioate), 2-cyanobut-2-yl-1-pyrroledithiocarbamate (also known as 2-cyanobut-2-yl-1-pyrrolecarbodithioate), benzyl-1-imidazole dithiocarbamate (also known as benzyl-1-imidazole carbodithioate), 2-cyanoprop-2-yl-N,N-dimethyldithiocarbamate, benzyl-N,N-diethyldithiocarbamate, cyanomethyl-1-(2-pyrrolidone)dithiocarbamate, 2-(ethoxycarbonylbenzyl)prop-2-yl-N,N-diethyldithiocarbamate, 1-phenylethyl dithiobenzoate, 2-phenylprop-2-yl dithiobenzoate, 1-acetic acid-1-yl-ethyl dithiobenzoate, 1-(4-methoxyphenyl)ethyl dithiobenzoate, benzyldithioacetate, ethoxycarbonylmethyldithioacetate, 2-(ethoxycarbonyl)prop-2-yl dithiobenzoate, 2-cyanoprop-2-yl dithiobenzoate, t-butyl dithiobenzoate, 2,4,4-trimethylpent-2-yl dithiobenzoate, 2-(4-chlorophenyl)-prop-2-yl dithiobenzoate, 3-vinylbenzyl dithiobenzoate, 4-vinylbenzyl dithiobenzoate, benzyldiethoxyphosphinyldithioformate, t-butyl trithioperbenzoate, 2-phenylprop-2-yl-4-chlorodithiobenzoate, naphthalene-1-carboxylic acid-1-methyl-1-phenyl-ethyl ester, 4-cyano-4-methyl-4-thiobenzylsulfanylbutyric acid, dibenzyltetrathioterephthalate, carboxymethyl dithiobenzoate, poly(ethylene oxide) with a dithiobenzoate end group, poly(ethylene oxide) with a 4-cyano-4-methyl-4-thiobenzylsulfanylbutyric acid end group, 2-[(2-phenylethanethiol)sulfanyl]propanoic acid, 2-[(2-phenylethanethiol)sulfanyl]succinic acid, 3,5-dimethyl-1H-pyrazole-1-carbodithioate potassium, cyanomethyl-3,5-dimethyl-1H pyrazole-1-carbodithioate, cyanomethylmethyl-(phenyl)dithiocarbamate, benzyl-4-chlorodithiobenzoate, phenylmethyl-4-chlorodithiobenzoate, 4-nitrobenzyl-4-chlorodithiobenzoate, phenylprop-2-yl-4-chlorodithiobenzoate, 1-cyano-1-methylethyl-4-chlorodithiobenzoate, 3-chloro-2-butenyl-4-chlorodithiobenzoate, 2-chloro-2-butenyl dithiobenzoate, benzyldithioacetate, 3-chloro-2-butenyl-1H pyrrole-1-dithiocarboxylic acid, 2-cyanobutane-2-yl-4-chloro-3,5-dimethyl-1H-pyrazole-1-carbodithioate, cyanomethyl methyl (phenyl) carbamodithioate, 2-cyano-2-propyldodecyltrithiocarbonate, dibenzyltrithiocarbonate, butyl benzyl trithiocarbonate, 2-[[(butylthio)thioxomethyl]thio]propionic acid, 2-[[(dodecylthio)thioxomethyl]thio]propionic acid, 2-[[(butylthio)thioxomethyl]thio] succinic acid, 2-[[(dodecylthio)thioxomethyl]thio]succinic acid, 2-[[(dodecylthio)thioxomethyl]thio]-2-methylpropionic acid, 2,2'-[carbonothioylbis(thio)]bis[2-methylpropionic acid], 2-amino-1-methyl-2-oxoethylbutyltrithiocarbonate, benzyl-2-[(2-hydroxyethyl)amino]-1-methyl-2-oxoethyltrithiocarbonate, 3-[[[(t-butyl)thio]thioxomethyl]thio]propionic acid, cyanomethyldodecyltrithiocarbonate, diethylaminobenzyltrithiocarbonate, and dibutylaminobenzyltrithiocarbonate.

The polymerization temperature of the chloroprene latex is not particularly limited and can be in the range of 0 to 50° C., preferably 20 to 50° C., at which emulsion polymerization is generally performed. The final polymerization rate of the chloroprene-based rubber obtained in the above-described polymerization step is not particularly limited, but is preferably arbitrarily adjusted within the range of 30 to 100%. In order to adjust the final conversion, the polymerization may be terminated by adding a polymerization terminator for terminating the polymerization reaction when the desired conversion is achieved.

The polymerization terminator is not particularly limited, and those commonly used can be used. Specific examples of the polymerization terminator include thiodiphenylamine, 4-tertiarybutylcatechol, 2,2-methylenebis-4-methyl-6-tertiarybutylphenol and the like.

Next, unreacted monomers are removed from the polymerization liquid obtained by the polymerization step. The method is not particularly limited, and includes, for example, a steam stripping method. After that, the chloroprene-based rubber is obtained through conventional processes such as adjusting the pH, freeze-coagulating, washing with water, and drying with hot air.

(2) Silica

Silica is added to the rubber composition as a filler. It is not particularly limited, for example, wet silica (hydrous silicic acid), dry silica (anhydrous silicic acid), and colloidal silica can be used. In the rubber composition of the present invention, use of wet silica is particularly preferred.

The Silica preferably has a CTAB (cetyltrimethylammonium bromide) adsorption specific surface area of 50 to 300 $m^2/g$, especially 80 to 250 $m^2/g$, in terms of processability and physical properties obtained. For example, NipSil AQ (CTAB adsorption specific surface area of 187 $m^2/g$) manufactured by TOSOH SILICA CORPORATION.

In this description, the CTAB adsorption specific surface area of the silica is a value obtained by measuring the amount of CTAB adsorption on the silica surface according to JIS K 6217-3:2001 "Part 3: Determination of specific surface area—CTAB adsorption method".

The amount of the silica added is 20 to 80 parts by mass, preferably 30 to 70 parts by mass, more preferably 40 to 60 parts by mass, with respect to 100 parts by mass of the chloroprene-based rubber. The amount of the silica added can be, for example, 20, 25, 30, 35, 40, 45, 50, 55, 60, 65, 70, 75, 80 parts by mass and may be in the range between the two values exemplified herein.

(3) Hydrate

The hydrate preferably has a structure that releases $H_2O$, for example, during kneading operation and vulcanization. The hydrate is more preferably a hydrate that releases $H_2O$ in a temperature range of 100° C. to 250° C., and even more preferably a hydrate that releases $H_2O$ in a temperature range of 100° C. to 150° C. Thereby, the reaction between the silane coupling agent and silica is promoted, and improved physical properties and vulcanization speed can be obtained.

The hydrate is not particularly limited, and those used in commercially available rubber compositions can be used. For example, hydrotalcite compounds represented by the following formula (1), hydrous salts, and metal hydroxides are available.

$$[M^{2+}_{1-x}M^{3+}_{x}(OH)_2]^{x+}[A^{n-}_{x/n}\cdot mH_2O]^{x-} \quad (1)$$

In the formula (1), $M^{2+}$ may be at least one divalent metal ion selected from $Mg^{2+}$, $Zn^{2+}$, and the like, $M^{3+}$ may be at least one trivalent metal ion selected from $Al^{3+}$, $Fe^{3+}$ and the like, $A^{n-}$ may be at least one anion selected from $CO_3^{2-}$, $Cl^-$, $NO_3^-$, and the like, and X may satisfy $0<X\leq0.33$.

Examples of the hydrotalcite compound include $Mg_{4.3}Al_2(OH)_{12.6}CO_3\cdot3.5H_2O$, $Mg_3ZnAl_2(OH)_{12}CO_3\cdot3H_2O$, $Mg_{4.5}Al_2(OH)_{13}CO_3\cdot3.5H_2O$, $Mg_{4.5}Al_2(OH)_{13}CO_3$, $Mg_4Al_2(OH)_{12}CO_3\cdot3.5H_2O$, $Mg_6Al_2(OH)_{16}CO_3\cdot4H_2O$, $Mg_5Al_2(OH)_{14}CO_3\cdot4H_2O$, and $Mg_3Al_2(OH)_{10}CO_3\cdot1.7H_2O$. $Mg_{4.3}Al_2(OH)_{12.6}CO_3\cdot3.5H_2O$, $Mg_3ZnAl_2(OH)_{12}CO_3\cdot3H_2O$ are more preferred.

Examples of the hydrous salt include $Al_2O_3\cdot3H_2O$, $Al_2O_3\cdot H_2O$, $Na_2SO_4\cdot10H_2O$, $CaSO_4\cdot2H_2O$, $NaHCO_3\cdot Na_2CO_3\cdot2H_2O$, $MgSO_4\cdot7H_2O$. $Al_2O_3\cdot3H_2O$ is more preferred.

Examples of the hydroxide include $Ca(OH)_2$, $Al(OH)_3$, $Mg(OH)_2$, $Zn(OH)_2$. $Mg(OH)_2$ is more preferred.

The amount of the hydrate added is 1 part by mass or more and less than 20 parts by mass, preferably 2 parts by mass or more and less than 20 parts by mass, and more preferably 4 to 10 parts by mass with respect to 100 parts by mass of the chloroprene-based rubber. The amount of hydrate added is, for example, 1, 2, 3, 4, 5, 6, 7, 8, 9, 10, 11, 12, 13, 14, 15, 16, 17, 18, 19 parts by mass, and may be in the range between the two values exemplified herein. By using the hydrate in this range, it is possible to obtain a rubber composition excellent in abrasion resistance and low temperature rise.

(4) Organic Peroxide

The organic peroxide is added to the rubber composition as a vulcanization aid and is not particularly limited, and examples include dicumyl peroxide, benzoyl peroxide, 1,1-bis(t-butylperoxy)-3,5,5-trimethylcyclohexane, diisobutyryl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, di(4-t-butylcyclohexyl)peroxydicarbonate, di(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanoate, disuccinic peroxide, 2,5-dimethyl-2,5-di(2-ethylhexanoylperoxy) hexane, t-hexylperoxy-2-ethylhexanoate, di(4-methylbenzoyl) peroxide, t-butyl peroxy-2-ethylhexanoate, di(3-methylbenzoyl) peroxide, benzoyl (3-methylbenzoyl) peroxide, dibenzoyl peroxide, 1,1-di(t-butylperoxy)-2-methylcyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di(4,4-di-(t-butylperoxy)cyclohexyl)propane, t-hexyl peroxy isopropyl monocarbonate, t-butyl peroxymaleate, t-butyl peroxy-3,5,5-trim ethylhexanoate, t-butyl peroxylaurate, t-butyl peroxyisopropyl monocarbonate, t-butyl peroxy 2-ethylhexyl monocarbonate, t-hexyl peroxybenzoate, 2,5-dimethyl-2,5-di(benzoylperoxy) hexane, t-butyl peroxyacetate, 2,2-di-(t-butylperoxy)butane, t-butyl peroxybenzoate, n-butyl 4,4-di-(t-butylperoxy)valerate, 1,4-bis[(t-butylperoxy)isopropyl]benzene, di-t-hexyl peroxide, 2,5-dimethyl-2,5-di(t-butylperoxy)hexane, t-butylcumyl peroxide, di-t-butyl peroxide, p-menthane hydroperoxide, 2,5-dimethyl-2,5-bis(t-butylperoxy)hexyne-3, diisopropylbenzene hydroperoxide, 1,1,3,3-tetramethylbutyl hydroperoxide, cumene hydroperoxide, and t-butyl hydroperoxide. Among these, one selected from dicumyl peroxide, 1,4-bis[(t-butylperoxy)isopropyl]benzene, t-butyl α-cumyl peroxide, 2,5-dimethyl-2,5-bis(t-butylperoxy) hexane, and 2,5-Dimethyl-2,5-bis(t-butylperoxy)hexin-3 is more preferred and 1,4-bis[(t-butylperoxy)isopropyl]benzene is particularly preferred.

The amount of the organic peroxide added is 0.3 to 1.4 parts by mass, preferably 0.4 to 1.3 parts by mass, particularly preferably 0.4 to 1.2 parts by mass, with respect to 100 parts by mass of the chloroprene-based rubber. The amount of the organic peroxide added is, for example, 0.3, 0.4, 0.5, 0.6, 0.7, 0.8, 0.9, 1.0, 1.1, 1.2, 1.3, 1.4 parts by mass, and may be in the range between the two values exemplified herein. By using the organic peroxide within this range, it is possible to obtain a rubber composition having an excellent balance of abrasion resistance, low temperature rise, and vulcanization speed.

(5) Silane Coupling Agent Having a Double Bond in Structure

In order to improve the dispersibility of the silica in the rubber and the reinforcing effect between the rubber and silica, the rubber composition according to one embodiment of the present invention contains 0.5 to 15 parts by mass of the silane coupling agent having a double bond in a structure of the silane coupling agent with respect to 100 parts by mass of silica. The content of the silane coupling agent having a double bond in its structure is preferably 0.5 to 15 parts by mass, more preferably 0.5 to 10 parts by mass, with respect to 100 parts by mass of silica. The content of the silane coupling agent having a double bond in its structure is, for example, 0.5, 0.6, 0.7, 0.8, 0.9, 1, 2, 3, 4, 5, 6, 7, 8, 9, 10, 11, 12, 13, 14, 15 parts by mass, and may be within a range between any two of the numerical values exemplified herein. By using the silane coupling agent having a double bond in its structure within this range, necessary and sufficient effects can be obtained and the occurrence of scorch can be suppressed.

The silane coupling agent having a double bond in its structure is not particularly limited except that it has a double bond in its structure, and those used in commercially available rubber compositions can be used. Examples of the silane coupling agent include vinyl-based coupling agents, styryl-based coupling agents, methacrylic-based coupling agents, and acrylic-based coupling agents. Vinyl-based coupling agents, methacrylic-based coupling agents, and acrylic-based coupling agents are particularly preferable from the viewpoint of processability and reinforcing effect. A silane coupling agent having a double bond in its structure preferably has a (meth)acrylic group in its structure, and even more preferably has a methacrylic group.

Examples of the silane coupling agent having a double bond in its structure include, specifically, vinyltrimethoxysilane, vinyltriethoxysilane, p-styryltrimethoxysilane, 3-acryloxypropyltrimethoxysilane, 3-(meth)acryloxypropylmethyldimethoxysilane, 3-(meth)acryloxypropylmethyltrimethoxysilane, 3-(meth)acryloxypropylmethyldiethoxysilane, 3-(meth)acryloxypropylmethyltriethoxysilane. Among these, vinyltrimethoxysilane, vinyltriethoxysilane, 3-methacryloxypropylmethyldimethoxysilane, 3-methacryloxypropylmethyltrimethoxysilane, 3-methacryloxypropylmethyldiethoxysilane, 3-methacryloxypropylmethyltriethoxysilane are preferred.

In addition, the rubber composition according to one embodiment of the present invention can also contain a silane coupling agent having no double bond in its structure. The content of the silane coupling agent having no double bond in its structure may be 0.5 to 15 parts by mass with respect to 100 parts by mass of silica. Moreover, the content of the silane coupling agent having no double bond in its structure is preferably less than the content of the silane coupling agent having a double bond in its structure. In the rubber composition according to one embodiment of the present invention, the content of the silane coupling agent having a double bond in the structure is preferably 50 parts by mass or more, more preferably 70 parts by mass or more, and even more preferably 90 parts by mass or more with respect to 100 parts by mass of the total amount of the silica contained in the rubber composition. The rubber composition according to one embodiment of the present invention may not contain a silane coupling agent having no double bond in its structure.

(6) Other Ingredients

A filler such as carbon black, a reinforcing material, a processing aid, an antioxidant, and the like may be added to the rubber composition as long as the effects of the present invention are not impaired.

Examples of the filler and the reinforcing material include, for example, carbon black, clay, talc, calcium carbonate, and the like. The filler and reinforcing material can be added in amounts that do not impair the heat resistance, and the amounts of these are preferably in the range of 5 to 100 parts by mass with respect to 100 parts by mass of the rubber composition.

Examples of the processing aid include fatty acids such as stearic acid, paraffin-based processing aids such as polyethylene, and fatty acid amides. The amount of the processing aid can be 0.5 to 5 parts by mass with respect to 100 parts by mass of the rubber composition.

As the antioxidant, general antioxidants such as amine-based antioxidants, imidazole-based antioxidants, metal carbamates, phenol-based antioxidants, and wax can be used. Examples of the antioxidant having a large effect of improving heat resistance include amine-based antioxidant such as 4,4'-bis(α,α-dimethylbenzyl)diphenylamine, octylated diphenylamine, and the like. In particular, 4,4'-bis(α,α-dimethylbenzyl)diphenylamine has a great effect of improving heat resistance. These antioxidants can be used alone, or two or more of these can be used in combination.

The plasticizer is not particularly limited as long as it is compatible with the chloroprene-based rubber. Examples of the plasticizer include vegetable oils such as rapeseed oil, phthalate-based plasticizers, DOS, DOA, ester-based plasticizers, ether- and ester-based plasticizers, thioether-based plasticizers, aromatic oils, naphthenic oils, and the like. These can be used alone, or two or more of these can be used in combination according to the properties required for the rubber composition. The amount of the plasticizer to be added is preferably 0 to 50 parts by mass with respect to 100 parts by mass of the rubber composition.

The rubber composition according to one embodiment of the present invention has a vulcanization rate (T90-T10) of preferably 25 minutes or less, more preferably 24 minutes or less, and further preferably 23 minutes or less. Here, the vulcanization speed is calculated by measuring vulcanization time (T90) at 160° C. for 60 minutes and the vulcanization time is determined by an oscillation disk rheometer (No. 292 lotus rheometer, manufactured by Toyo Seiki Seisaku-sho, Ltd.), in accordance with the SRIS3102-1977 in Standard of the Society of Rubber Industry, Japan.

Method for Manufacturing Rubber Composition

The rubber composition is obtained by kneading the above compounds at a temperature below the vulcanization temperature. Examples of the kneading device include a mixer, a Banbury mixer, a kneader mixer, two roll mills, and the like.

Vulcanized Molded Body

A vulcanized molded body of the rubber composition is obtained by molding the above rubber composition into various desired shapes and then vulcanizing it, or by molding the rubber composition into various shapes after vulcanizing the rubber composition. Examples of the methods for molding the vulcanized molded body from the rubber composition include methods such as press molding, extrusion molding, and calender molding.

The temperature at which the rubber composition is vulcanized may be appropriately set according to its composition, and is usually in the range of 140 to 220° C., preferably 160 to 190° C. Also, the vulcanization time may be appropriately set depending on the composition and shape of the rubber composition, and is usually in the range of 10 to 60 minutes.

The vulcanized molded body is obtained by vulcanizing and molding the rubber composition described above and has a good vulcanization rate and is excellent in abrasion resistance and low temperature rise.

The vulcanized molded body according to one embodiment of the present invention preferably has a ΔV of 80 $mm^3$ or less, more preferably 76 $mm^3$ or less, and even more preferably 70 m"3 or less in an Akron abrasion test (1000 times abrasion, abrasion volume ΔV, unit: $mm^3$) in accordance with JIS K 6264-2:2019. Here, the vulcanized molded body may be obtained by press-vulcanizing the rubber composition according to one embodiment of the present invention at 160° C. for 40 minutes and may have a diameter of 63.6 mm, a thickness of 12.7 mm, and a center hole of 12.7 mm.

The vulcanized molded body according to one embodiment of the present invention preferably has a temperature rise (ΔT) of 35° C. or less, more preferably 33° C. or less, and even more preferably 30° C. or less. The temperature rise (ΔT) may be measured in accordance with HS K 6265:2019, under the conditions of 40° C., strain of 0.175 inches, load of 55 lb, and frequency of vibration of 1,800 times per minute. Here, the vulcanized molded body may be obtained by press-vulcanizing the rubber composition according to one embodiment of the present invention at 160° C. for 40 minutes and may be cylindrical with a diameter of 15 mm and a height of 25 mm.

EXAMPLES

Manufacturing Chloroprene-Acrylonitrile Copolymer Rubber:

To a polymerization vessel with an inner volume of 3 liters equipped with a heating and cooling jacket and a stirrer, 24 parts by mass of chloroprene monomer, 24 parts by mass of acrylonitrile monomer, 0.5 parts by mass of diethylxanthogen disulfide, 200 parts by mass of pure water, 5.00 parts by mass of potassium rosinate (manufactured by Harima Chemicals Group, Inc.), 0.40 parts by mass of sodium hydroxide, and 2.0 parts by mass of sodium salt of 3-naphthalenesulfonic acid formalin condensate (manufactured by Kao Corporation) were added. 0.1 part by mass of potassium persulfate was added as a polymerization initiator, and emulsion polymerization was carried out at a polymerization temperature of 40° C. under a nitrogen stream. The chloroprene monomer was added in portions from 20 seconds after the initiation of polymerization. Based on the change in the heat quantity of the refrigerant for 10 seconds from the start of polymerization, the flow rate to be added in portions was adjusted with a solenoid valve. Thereafter, the flow rate was readjusted every 10 seconds, and the addition was continuously performed in portions. When the polymerization rate with respect to the total amount of the chloroprene monomer and the acrylonitrile monomer reached 50%, 0.02 parts by mass of phenothiazine as a polymerization terminator was added to terminate the polymerization. Thereafter, unreacted monomers were removed from the reaction solution under reduced pressure to obtain a chloroprene-acrylonitrile copolymer latex.

The above-described polymerization rate [%] of the chloroprene-acrylonitrile copolymer latex was calculated from the dry mass when the chloroprene-acrylonitrile copolymer latex was air-dried. Specifically, it was calculated by the following formula (A). In the formula, "Solid Content Concentration" is the solid content concentration [% by mass], which is obtained by heating 2 g of the sampled chloroprene-acrylonitrile copolymer latex at 130° C. and removing volatile components such as a solvent (water), a volatile chemical and raw materials. The "Total Charged Amount" is the total amount [g] of raw materials, chamicals and solvent (water) charged into the polymerization vessel from the start of polymerization to a certain time. The "Evaporation Residue" is the mass [g] of chemicals remaining as solid content together with the polymer without being volatilized under conditions of 130° C. among the chemicals and raw materials charged from the start of polymerization to a certain time. The "amount of monomer charged" is the total amount [g] of the amount of the monomer initially charged in the polymerization vessel and the amount of the monomer added in portions from the start of the polymerization to a certain time. In addition, the "monomer" here is the total amount of chloroprene and acrylonitrile.

$$\text{Polymerization Rate}=\{[(\text{Total Charged Amount}\times\text{Solid Content Concentration}/100)-\text{Evaporation Residue}]/\text{Charged Amount of Monomer}\}\times 100 \quad \text{(A)}$$

After adjusting the pH of the above-mentioned chloroprene-acrylonitrile copolymer latex to 7.0 using acetic acid or sodium hydroxide, the chloroprene-acrylonitrile copolymer latex is freeze-coagulated on a metal plate cooled to −20° C. and demulsified to obtain a sheet. The sheet was washed with water and dried at 130° C. for 15 minutes to obtain a solid chloroprene-acrylonitrile copolymer rubber (chloroprene-acrylonitrile copolymer).

The above-mentioned chloroprene-acrylonitrile copolymer rubber was dissolved in THF to prepare a solution with a concentration of 0.1% by mass, and then the weight average molecular weight (Mw), number average molecular weight (Mn) and molecular weight distribution (Mw/Mn) of the chloroprene-acrylonitrile copolymer rubber (standard polystyrene equivalent) were measured using a high-speed GPC device (TOSOH HLC-8320GPC: manufactured by Tosoh Corporation). At that time, using TSK guard column HHR-H as a pre-column, using three HSKgelGMHHR-H as analytical columns, the sample pump pressure was set to 8.0-9.5 MPa, the flow rate was set to 1 mL/min, the sample was eluted at 40° C., and detected using a differential refractometer.

The elution time and molecular weight were obtained using a calibration curve prepared by measuring the following nine standard polystyrene samples with known molecular weights.

$$Mw=8.42\times10^{6},\ 1.09\times10^{6},\ 7.06\times10^{5},\ 4.27\times10^{5},\ 1.90\times10^{5},\ 9.64\times10^{4},\ 3.79\times10^{4},\ 1.74\times10^{4},\ 2.63\times10^{3}$$

The chloroprene-acrylonitrile copolymer rubber had a weight average molecular weight (Mw) of $473\times10^3$ g/mol, a number average molecular weight (Mn) of $138\times10^3$ g/mol and a molecular weight distribution (Mw/Mn) of 3.4.

The content of the acrylonitrile monomer unit contained in the chloroprene-acrylonitrile copolymer rubber was calculated from the content of nitrogen atoms in the chloroprene-acrylonitrile copolymer rubber. Specifically, using an elemental analyzer (SUMIGRAPH 220F: manufactured by Sumika Chemical Analysis Service, Ltd.), the content of nitrogen atoms in 100 mg of chloroprene-acrylonitrile copolymer rubber was measured, and the content of the monomer unit of acrylonitrile was calculated. The content of the acrylonitrile monomer unit was 9.9% by mass.

The elemental analysis described above was performed as follows. The temperature of the electric furnace was set to 900° C. for the reaction furnace, 600° C. for the reduction furnace, 70° C. for the column temperature, and 100° C. for the detector temperature. Oxygen gas was flowed at 0.2 mL/min as combustion gas, and helium gas was flowed at 80 mL/min as carrier gas. Calibration curves were prepared using aspartic acid (10.52%), which has a known nitrogen content, as a standard.

Example 1

Manufacture of Rubber Composition

The rubber compositions of Examples and Comparative Examples were obtained by kneading the components shown in Table 1 or Table 2, that is, 10 parts by mass of a plasticizer, 1 part by mass of a processing aid, and 3 parts by mass of a heat antioxidant with an 8-inch open roll.

Each component used to obtain the rubber composition is as follows.

Chloroprene rubber polymer 1: the above chloroprene-acrylonitrile copolymer rubber Chloroprene polymer 2: Chloroprene rubber (chloroprene homopolymer), "S-40V" manufactured by Denka Company Limited Silica: CTAB adsorption specific surface area 187 $m^2/g$ "Nipsil AQ" manufactured by TOSOH SILICA CORPORATION Carbon black: carbon black (FEF): Asahi Carbon Co., Ltd. product name "Asahi #60"

Silane coupling agent 1: 3-methacryloxypropyltrimethoxysilane "KBM-503" manufactured by Shin-Etsu Chemical Co., Ltd.

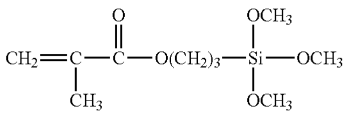

Silane coupling agent 2: vinyltrimethoxysilane Shin-Etsu Chemical Co., Ltd. "KBM-1003"

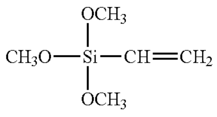

Hydrotalcite 1: chemical formula $Mg_{4.3}Al_2(OH)_{12.6}CO_3 \cdot 3.5H_2O$ manufactured by Kyowa Chemical Industry Co., Ltd. "DHT-4A"

Hydrotalcite 2: chemical formula $Mg_3ZnAl_2(OH)_{12}CO_3 \cdot 3H_2O$ manufactured by Kyowa Chemical Industry Co., Ltd. "ZHT-4A"

Magnesium oxide: "Kyowamag (registered trademark) 150" manufactured by Kyowa Chemical Industry Co., Ltd.

Organic peroxide 1: 1,4-bis[(t-butylperoxy)isopropyl] benzene manufactured by NOF CORPORATION "Perbutyl (registered trademark) P"

Organic peroxide 2: 2,5-dimethyl-2,5-bis(t-butylperoxy) hexyne-3 manufactured by NOF CORPORATION, product name "Perhexyne (registered trademark) 25B"

Plasticizer: Polyetherester-based "ADEKA CIZER (registered trademark) RS-700" manufactured by ADEKA Corporation Processing aid: stearic acid "Stearic acid 50S" manufactured by New Japan Chemical Co., Ltd.

Heat resistant antioxidant: 4,4'-bis(α,α-dimethylbenzyl) diphenylamine "Nocrak (registered trademark) CD" manufactured by OUCHI SHINKO CHEMICAL INDUS TRIAL CO., LTD

Evaluation of Vulcanization Rate

For the rubber composition described above, vulcanization time (T90) at 160° C. for 60 minutes was measured and vulcanization rate (T90-T10) was calculated using an oscillation disk rheometer (No. 292 lotus rheometer, manufactured by Toyo Seiki Seisaku-sho, Ltd.), in accordance with the SRIS3102-1977 in Standard of the Society of Rubber Industry, Japan. The results are shown in Tables 1 and 2.

Abrasion Resistance

The obtained rubber composition was press-vulcanized at 160° C. for 40 minutes to prepare a vulcanized molded body having a diameter of 63.6 mm, a thickness of 12.7 mm, and a center hole of 12.7 mm. The obtained vulcanized molded body was subjected to an Akron abrasion test (1000 times abrasion, abrasion volume ΔV, unit: $mm^3$) in accordance with JIS K 6264-2:2019. Those having a ΔV of 80 $mm^3$ or less were judged to be good. The results are shown in Tables 1 and 2.

Temperature Rise

The obtained rubber composition was press-vulcanized at 160° C. for 40 minutes to prepare a vulcanized molded body having a cylindrical vulcanized molded body having a diameter of 15 mm and a height of 25 mm. The temperature rise (ΔT) of the obtained vulcanized molded body was measured in accordance with JIS K 6265: 2019 under the conditions of 40° C., strain of 0.175 inches, load of 55 lb, and frequency of vibration of 1,800 times per minute. Those having a ΔT of 35° C. or less were judged as acceptable. Tables 1 and 2 show the results.

TABLE 1

| | | | Example | | | | | | | | | | | |
|---|---|---|---|---|---|---|---|---|---|---|---|---|---|---|
| | | unit | 1 | 2 | 3 | 4 | 5 | 6 | 7 | 8 | 9 | 10 | 11 | 12 |
| Formulation | Chloroprene-acrylonitrile copolymer rubber | Parts by mass | 100 | 100 | 100 | 100 | 100 | 100 | 100 | 100 | 100 | 100 | 100 | |
| | Chloroprene rubber | Parts by mass | | | | | | | | | | | | 100 |
| | Silica | Parts by mass | 50 | 70 | 30 | 50 | 50 | 50 | 50 | 50 | 50 | 50 | 50 | 50 |
| | Carbon black | Parts by mass | | | | | | | | | | | | |
| | Silane coupling agent 1 | Parts by mass | 3 | 3 | 3 | 0.3 | | 3 | 3 | 3 | 3 | 3 | 3 | 3 |

TABLE 1-continued

| | | unit | Example 1 | 2 | 3 | 4 | 5 | 6 | 7 | 8 | 9 | 10 | 11 | 12 |
|---|---|---|---|---|---|---|---|---|---|---|---|---|---|---|
| | Silane coupling agent 2 | Parts by mass | | | | | 3 | | | | | | | |
| | Hydrotalcite 1 | Parts by mass | 4 | 4 | 4 | 4 | 4 | 2 | 15 | | 4 | 4 | 4 | 4 |
| | Hydrotalcite 2 | Parts by mass | | | | | | | | 4 | | | | |
| | Magnesium oxide | Parts by mass | | | | | | | | | | | | |
| | Organic peroxide 1 | Parts by mass | 0.8 | 0.8 | 0.8 | 0.8 | 0.8 | 0.8 | 0.8 | 0.8 | 0.4 | 1.2 | | 0.8 |
| | Organic peroxide 2 | Parts by mass | | | | | | | | | | | 0.8 | |
| | Silane coupling agent/Silica | | 6 | 4.3 | 10 | 0.6 | 6 | 6 | 6 | 6 | 6 | 6 | 6 | 6 |
| Evaluation | Vulcanization speed ARR (at 160° C. for 60 minutes, T90-T10) | min | 21.1 | 23.2 | 20.8 | 16.5 | 23.3 | 23.8 | 19.5 | 19.3 | 24.6 | 16.8 | 24.2 | 23.2 |
| | Akron abrasion test 1000 times abrasion abrasion volume ΔV | $mm^3$ | 35 | 62 | 43 | 79 | 58 | 32 | 76 | 58 | 42 | 69 | 32 | 51 |
| | Low temperature rise Goodrich Flexometer temperature rise ΔT | ° C. | 26 | 34 | 24 | 32 | 31 | 25 | 35 | 28 | 30 | 24 | 28 | 27 |

TABLE 2

| | | unit | Comparative Example 1 | 2 | 3 | 4 | 5 | 6 | 7 | 8 | 9 |
|---|---|---|---|---|---|---|---|---|---|---|---|
| Formulation | Chloroprene-acrylonitrile copolymer rubber | Parts by mass | 100 | | 100 | 100 | 100 | 100 | 100 | 100 | 100 |
| | Chloroprene rubber | Parts by mass | | 100 | | | | | | | |
| | Silica | Parts by mass | 50 | 50 | 100 | 10 | 50 | 50 | 50 | 50 | |
| | Carbon black | Parts by mass | | | | | | | | | 50 |
| | Silan coupling agent 1 | Parts by mass | 3 | 3 | 3 | 3 | 3 | 0.2 | 3 | 3 | |
| | Silan coupling agent 2 | Parts by mass | | | | | | | | | |
| | Hydrotalcite 1 | Parts by mass | | | 4 | 4 | 20 | 4 | 4 | 4 | 4 |
| | Hydrotalcite 2 | Parts by mass | | | | | | | | | |
| | Magnesium oxide | Parts by mass | 4 | 4 | | | | | | | |
| | Organic peroxide 1 | Parts by mass | 0.8 | 0.8 | 0.8 | 0.8 | 0.8 | 0.8 | 1.5 | 0.2 | 0.8 |
| | Organic peroxide 2 | Parts by mass | | | | | | | | | |
| | Silane coupling agent/Silica | | 6 | 6 | 3 | 30 | 6 | 0.4 | 6 | 6 | — |
| Evaluation | Vulcanization speed ARR (at 160° C. for 60 minutes, T90-T10) | min | 27.9 | 26.8 | 25.2 | 19.1 | 24.8 | 14.2 | 14.8 | 27.5 | 35.6 |
| | Akron abrasion test 1000 times abrasion abrasion volume ΔV | $mm^3$ | 98 | 106 | 103 | 168 | 124 | 89 | 88 | 102 | 132 |
| | Low temperature rise Goodrich Flexometer temperature rise ΔT | ° C. | 42 | 41 | 44 | 19 | 39 | 34 | 23 | 46 | 52 |

From the results shown in Tables 1 and 2, it was found that the rubber composition of the present invention improves vulcanization speed, abrasion resistance and temperature rise. Since the vulcanized molded body has these properties, it can be suitably used as a molded body such as a rubber roll.

The invention claimed is:

1. A rubber composition comprising:

100 parts by mass of a chloroprene-based rubber;

20 to 80 parts by mass of silica;

1 part by mass or more and less than 20 parts by mass of a hydrate; and 0.3 to 1.4 parts by mass of an organic peroxide, wherein:

the rubber composition includes 0.5 to 15 parts by mass of a silane coupling agent having a double bond in a structure of the silane coupling agent with respect to 100 parts by mass of the silica and a rubber component contained in the rubber composition consists of the chloroprene-based rubber.

2. The rubber composition of claim 1, wherein the chloroprene-based rubber contains a homopolymer of 2-chloro-1,3-butadiene or a copolymer of 2-chloro-1,3-butadiene and at least one monomer selected from 2,3-dichloro-1,3-butadiene and acrylonitrile.

3. The rubber composition of claim 1, wherein the silane coupling agent having a double bond in the structure of the silane coupling agent is at least one silane coupling agent selected from vinyltrimethoxysilane, vinyltriethoxysilane, 3-(meth)acryloxypropyl methyl dimethoxysilane, 3-(meth) acryloxypropyl methyl trimethoxysilane, 3-(meth)acryloxypropylmethyldiethoxysilane and 3-(meth)acryloxypropylmethyltriethoxysilane.

4. The rubber composition of claim 1, wherein the hydrate is a hydrate releasing $H_2O$ in a temperature range of 100° C. to 250° C.

5. The rubber composition of claim 1, wherein the hydrate is at least one hydrate selected from a hydrotalcite compound represented by formula (1), a hydrated salt, and a metal hydroxide, $$[M^{2+}_{1-x}M^{3+}_{x}(OH)_2]^{x+}[A^{n-}_{x/n}\cdot mH_2O]^{x-} \quad (1)$$

in the formula (1), $M^{2+}$ is at least one divalent metal ion selected from $Mg^{2+}$, $Mn^{2+}$, $Fe^{2+}$, $Co^{2+}$, $Ni^{2+}$, $Cu^{2+}$, and $Zn^{2+}$, $M^{3+}$ is at least one trivalent metal ion selected from $Al^{3+}$, $Fe^{3+}$, $Cr^{3+}$, $Co^{3+}$, and $In^{3+}$, and $A^{n-}$ is at least one anion selected from $OH^-$, $F^-$, $Cl^-$, $Br^-$, $NO_3^-$, $CO_3^{2-}$, $SO_4^{2-}$, $Fe(CN)_6^{3-}$, and $CH_3COO^-$, and X satisfies $0<X\leq0.4$; and $m>0$.

6. The rubber composition of claim 1, wherein the hydrate is at least one hydrate selected from hydrotalcite compounds represented by $Mg_{4.3}Al_2(OH)_{12.6}CO_3\cdot3.5H_2O$, $Mg_3ZnAl_2(OH)_{12}CO_3\cdot3H_2O$, $Mg_{4.5}Al_2(OH)_{13}CO_3\cdot3.5H_2O$, $Mg_{4.5}Al_2(OH)_{13}CO_3$, $Mg_4Al_2(OH)_{12}CO_3\cdot3.5H_2O$, $Mg_6Al_2(OH)_{16}CO_3\cdot4H_2O$, $Mg_5Al_2(OH)_{14}CO_3\cdot4H_2O$, and $Mg_3Al_2(OH)_{10}CO_3\cdot1.7H_2O$.

7. The rubber composition of claim 1, wherein the organic peroxide is at least one organic peroxide selected from dicumyl peroxide, 1,4-bis[(t-butylperoxy)isopropyl]benzene, t-butyl α-cumyl peroxide, 2,5-dimethyl-2,5-bis(t-butylperoxy)hexane, and 2,5-dimethyl-2,5-bis(t-butylperoxy)hexyne-3.

8. The rubber composition of claim 1, wherein the silica has a cetyltrimethylammonium bromide (CTAB) adsorption specific surface area of 50 to 300 $m^2/g$.

9. A vulcanizate of the rubber composition of claim 1.

10. A vulcanized molded body of the rubber composition of claim 1.

11. The rubber composition of claim 1, wherein the rubber composition has a vulcanization speed T90-T10 of 25 minutes or less at 160° C. for 60 minutes, measuring in accordance with the Society of Rubber Industry, Japan Standard SRIS 3102-1977.

* * * * *